United States Patent [19]

Frabe

[11] 3,937,563
[45] Feb. 10, 1976

[54] REMOTE CONTROLLED MIRROR ASSEMBLY FOR VEHICLE

[76] Inventor: Donald A. Frabe, 72nd St., Rte. 3, South Haven, Mich. 49090

[22] Filed: Mar. 21, 1974

[21] Appl. No.: 453,219

[52] U.S. Cl. ............ 350/289; 350/302; 350/307; 248/480
[51] Int. Cl.² .......................................... G02B 5/08
[58] Field of Search................ 350/289, 302, 307; 248/480

[56] References Cited
UNITED STATES PATENTS

| | | | |
|---|---|---|---|
| 3,390,937 | 7/1968 | Nicholson | 350/289 |
| 3,527,528 | 9/1970 | McKee et al. | 350/289 UX |
| 3,820,877 | 6/1974 | Moyer | 350/289 |
| 3,825,324 | 7/1974 | Brewington | 350/289 |

Primary Examiner—Alfred E. Smith
Assistant Examiner—F. L. Evans
Attorney, Agent, or Firm—Woodhams, Blanchard and Flynn

[57] ABSTRACT

A remote controlled mirror system for attachment to a vehicle, particularly a truck, having both a righthand and a lefthand mirror assembly. The mirror system includes an elongated support mountable on the vehicle, such as on the roof, and extending transversely thereacross. The support has right and left extendible assemblies telescopically associated therewith, which assemblies respectively have the righthand and lefthand mirror assemblies mounted on the free ends thereof. Each extendible assembly includes a fluid pressure cylinder positioned within the support for permitting the respective mirror assembly to be moved inwardly or outwardly relative to the side of the vehicle. Each mirror assembly also has a power unit, preferably a fluid pressure cylinder, associated therewith for permitting the respective mirror to be angularly tilted about a substantially vertical axis. The fluid pressure cylinders associated with the extendible assemblies and the mirror assemblies are all independently operable by means of a control unit located within the vehicle adjacent the driver.

5 Claims, 7 Drawing Figures

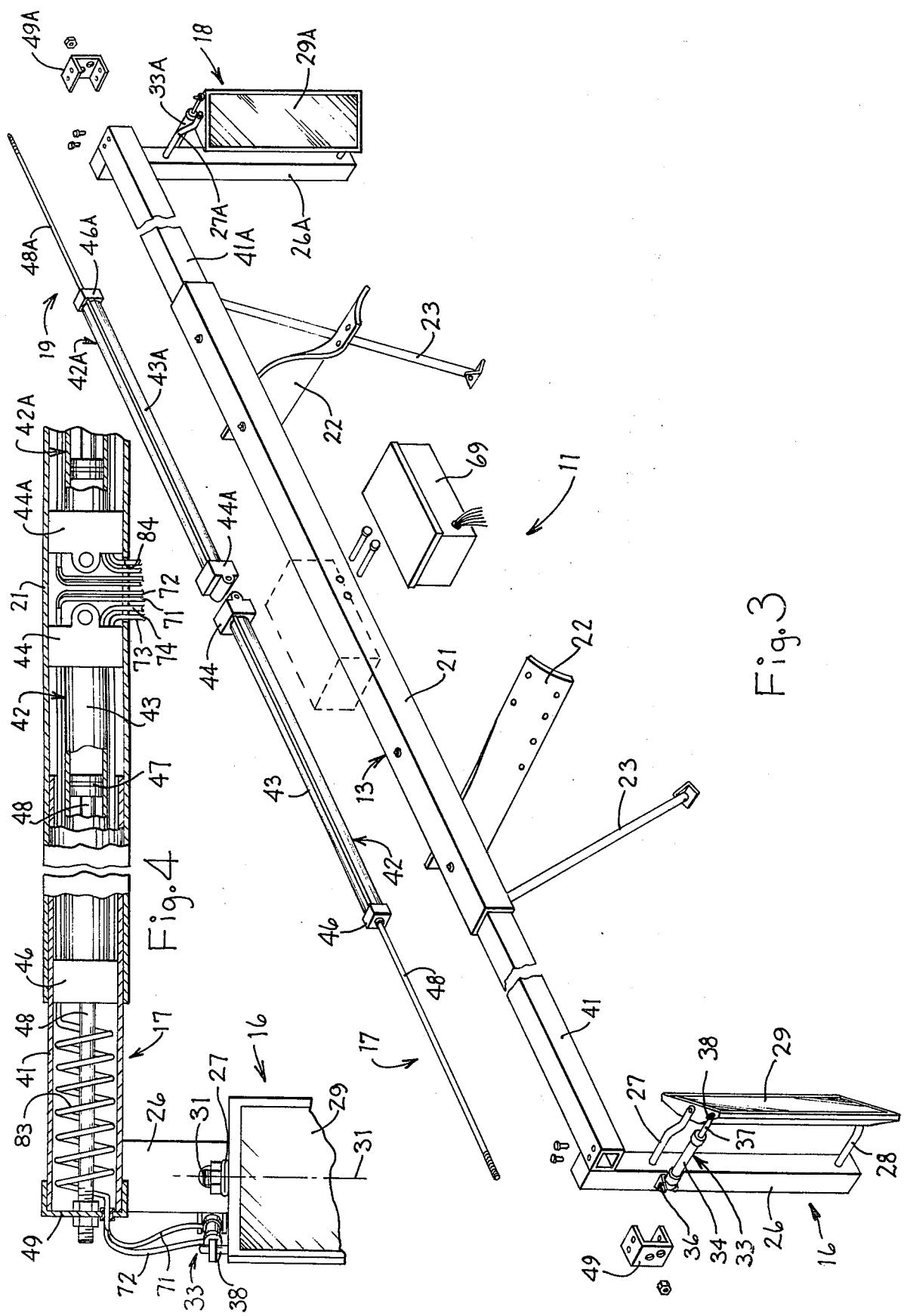

REMOTE CONTROLLED MIRROR ASSEMBLY FOR VEHICLE

FIELD OF THE INVENTION

This invention relates to a remote controlled mirror system adapted for attachment to a vehicle and, in particular, to an improved mirror system which includes both righthand and lefthand mirrors which can be individually moved inwardly or outwardly relative to the sides of the vehicle and which can also be individually angularly tilted.

BACKGROUND OF THE INVENTION

The lack of adequate visability by the use of rearview mirrors is a problem which has long confronted the trucking industry. The known systems have proven totally inadequate due to their extremely limited adjustment capability. Further, whatever adjustments are available can be made only under conditions which are less than desirable. For example, the rearview mirror system is extremely important when a truck is backing up, but most of the known systems have proven inadequate under this type of operational condition due to the continual variation in the angular orientation of the tractor relative to the trailer. The known mirror systems do not have any acceptable means for permitting a continual adjustment to be made so as to compensate for this variable angular orientation between the tractor and the trailer. Thus, at the present time, the driver often cannot see along one or both sides of the vehicle while backing up.

Further, when a truck is backing up, obstructions such as trees or posts also create a problem. It sometimes happens that the obstruction is positioned in the path of movement of the mirror, inasmuch as the mirror projects outwardly a substantial distance from the side of the tractor. This problem can normally be overcome only by disconnecting or collapsing the mirror, which requires substantial time and effort and can be performed only by having the driver leave the vehicle and manually collapse or demount the mirror. This is, needless to say, a totally undesirable and highly inefficient operation.

The inadequacies of the known rearview mirror system have been still further emphasized by the increased and widely varying widths of loads which are presently hauled on the highways, specifically modular homes, house trailers and the like. Due to the substantial variation in the width of such loads, it is necessary to adjust the distance by which the mirrors are spaced from the vehicle in order to provide optimum visability along the sides of the load. The known mirror systems have permitted such adjustment only by requiring that the driver manually adjust the assembly so as to extend same outwardly through the desired extent, which adjustment can be performed only when the driver is positioned exteriorly of the tractor. Further, this adjustment normally requires the use of tools in order to make the adjustment, and likewise requires substantial time and effort.

In an attempt to provide increased driver visability, many of the rearview mirror systems have been provided with remote control devices for permitting angular adjustment of the mirror about a substantially vertical axis, which angular adjustment can be made by the driver while located in the vehicle. Most of these devices, however, have not been totally acceptable or satisfactory since many of them have utilized cables or the like extending into the vehicle and actuatable by the driver for angularly adjusting the mirror. Such cable systems have generally been found to bind or slip after repetitive usage, and thus are unable to perform the desired angular adjustment.

Accordingly, it is an object of the present invention to provide an improved remote controlled mirror system adapted for attachment to a vehicle, which mirror system overcomes the above-mentioned disadvantages. Particularly, it is an object of the present invention to provide:

1. An improved remote controlled mirror system adapted for attachment to a vehicle and having a mirror positionable adjacent each side of the vehicle, said mirror system including control means permitting both the angular orientation of the mirrors and the spacing of the mirrors from the sides of the vehicle to be selectively varied in an easy and efficient manner by the driver of the vehicle while remaining within the interior of the vehicle.

2. A mirror system, as aforesaid, including a control system associated with the mirrors for permitting each mirror to be individually angularly adjusted and for permitting each mirror to be individually extended or retracted relative to vary the spacing of same from the vehicle.

3. A mirror system, as aforesaid, wherein the control system includes a fluid pressure cylinder associated with the righthand mirror and a further fluid pressure cylinder associated with the lefthand mirror, said fluid pressure cylinders being independently energizable and controllable for permitting the lefthand and righthand mirrors to be individually moved outwardly from or inwardly toward the respective side of the vehicle.

4. A mirror system, as aforesaid, wherein there is also provided a separate fluid pressure cylinder associated with each mirror and independently actuatable for permitting the angular orientation of same to be selectively varied.

5. A mirror system, as aforesaid, which by its independent control over the spacing and angular orientation of each mirror, can be efficiently adjusted by the driver when located within the vehicle to provide maximum visibility along both sides of the vehicle while also permitting the mirrors to be momentarily adjusted as required so as to move same around obstructions and the like.

6. A mirror system, as aforesaid, which can be constructed and installed in an efficient and economical manner, which is efficient and simple in operation, which is strong and durable, and which requires little if any maintenance.

Other objects and purposes of the present invention will be apparent to persons acquainted with structures of this general type upon reading the following specification and inspecting the accompanying drawings.

BRIEF DESCRIPTION OF THE DRAWINGS

FIG. 3 is partially exploded, perspective view of the mirror system according to the present invention.

FIG. 4 is a fragmentary, sectional, elevational view illustrating the extendible support structure.

Figure 1:
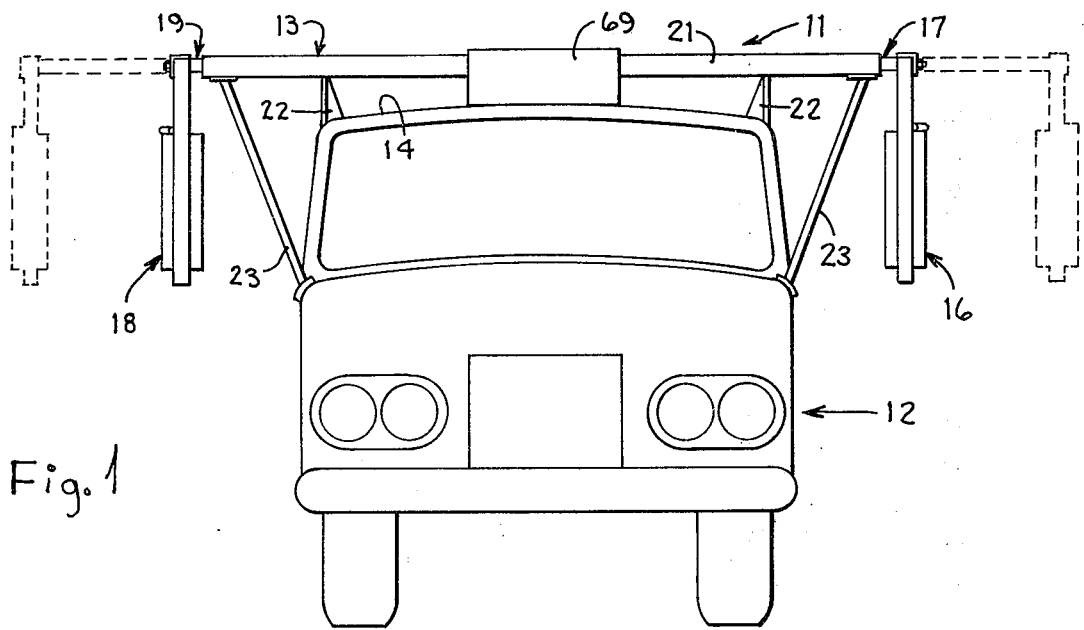
FIG. 1 is a front elevational view of a vehicle, specifically a truck, having the improved mirror system of the present invention mounted thereon.

Certain terminology will be used in the following description for convenience in reference only and will not be limiting. For example, the words "upwardly", "downwardly", "leftwardly" and "rightwardly" will refer to directions in the drawings to which reference is made. The words leftwardly and rightwardly will also be used to refer to the left and right sides, respectively, of the vehicle as viewed by the driven when located in the driver's seat. The word "forwardly" will be used to refer to the normal direction of travel of the vehicle, and the word "rearwardly" will refer to the reverse direction. The words "inwardly" and "outwardly" will be used to refer to directions toward and away from, respectively, the geometric center of the mirror system and associated components thereof. Said terminology will include the words above specifically mentioned, derivatives thereof and words of similar import.

SUMMARY OF THE INVENTION

The objects and purposes of the present invention are met by providing a mirror system which includes an elongated tubular support adapted to be attached to and extend transversely across a vehicle. A pair of extension assemblies are slidably mounted on the support and extend outwardly from opposite ends thereof, whereby the extension assemblies extend outwardly from the right and left sides of the vehicle. Each extension assembly includes a fluid pressure cylinder positioned within the support and connected to a slide member which extends outwardly from the support. The fluid pressure cylinders associated with the right and left extension assemblies are independently controlled to permit the right and left extension assemblies to be individually extended or retracted relative to the sides of the vehicle. Each extension assembly has a mirror assembly attached to the free end thereof, which mirror assembly also has a fluid pressure cylinder connected thereto for permitting the angular orientation of each mirror to be selectively adjusted about a substantially vertical axis. Suitable controls are located within the compartment of the vehicle to permit the driver to individually and selectively control both the extension and angular orientation of both the righthand and lefthand mirror assemblies.

DETAILED DESCRIPTION

Figure 2:
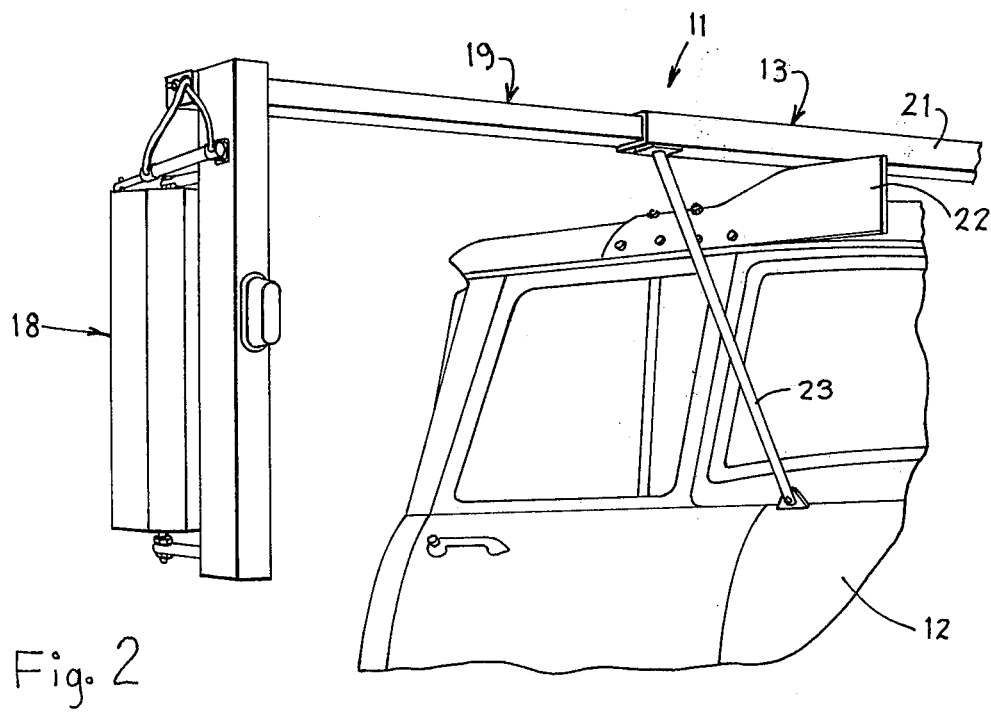
FIG. 2 is a fragmentary perspective view of a portion of the mirror system mounted on a vehicle.

FIGS. 1 and 2 illustrate therein an improved mirror system 11 constructed according to the present invention, which system is adapted to be attached to a vehicle 12, particularly a truck or like vehicle.

The mirror system 11 comprises a frame 13 which is adapted to be secured to the vehicle, and particularly the vehicle roof 14 as illustrated in FIGS. 1 and 2. The frame 13 supports a lefthand mirror assembly 16 which is mounted on the outer free end of a left extension assembly 17, and a righthand mirror assembly 18 is mounted on the outer free end of a right extension assembly 19. The extension assemblies 17 and 19 permit the respective mirrors 16 and 18 to be individually moved outwardly away from the vehicle through a selected distance, as illustrated by the dotted line positions indicated in FIG. 1.

The frame 13 includes an elongated tubular support 21 which extends transversely across the vehicle and is of sufficient length such that the ends thereof are spaced outwardly at least a small distance from the adjacent sides of the vehicle. The support 13, which in the illustrated embodiment is of rectangular cross section, is fixedly secured to the vehicle in any suitable manner. In the illustrated embodiment, the support 13 is fixed to the vehicle roof 14 by intermediate roof brackets 22. Strengthening braces 23 are also connected to the support 13 adjacent the free ends thereof for rigidifying the overall structure.

Considering now the lefthand mirror assembly 16, and referring specifically to FIGS. 3 and 4, same includes a vertically extending support post 26 having a pair of arms 27 and 28 fixedly secured thereto and projecting rearwardly therefrom. A conventional mirror 29 extends between and is pivotally supported on the arms 27 and 28. The mirror 29 is provided with a suitable frame having stub shafts 31 thereon which extend through openings formed adjacent the free ends of the arms 27 and 28 for permitting attachment of the mirror 29 to the arms. The stub shaft 31 defines a substantially vertically extending pivot axis 32 about which the mirror 29 is angularly tiltable so as to adjust the orientation thereof with respect to the vehicle.

To permit the angular orientation of the mirror 29 to be adjusted, there is provided a power unit 33 which, in a preferred embodiment of the invention, comprises a fluid pressure cylinder. The cylinder 33, as illustrated, is of the double-acting type and includes a conventional cylinder housing 34 having one end thereof pivotally connected to the post 26, as by means of a clevis 36. The cylinder housing 34 slidably supports therein a conventional piston (not shown), which in turn is connected to a piston rod 37 which projects outwardly from the other end of the cylinder housing and has the free end thereof pivotally connected to a pin 38 associated with the mirror 29. The pin 38 is positioned adjacent one vertical edge of the mirror and is thus spaced a substantial distance from the pivot axis 32, whereby extension or retraction of the pressure cylinder 33 causes angular tilting of the mirror 29 about the axis 32.

The upper end of the vertical post 26 is fixedly connected to the free or outer end of an elongated slide member 41, which slide member is a part of the left extension assembly 17. The side member 41 comprises an elongated tubular member which is telescopically received within and slidably supported by the support 21. The slide member 41 is of similar but slightly smaller cross section then the support 21. Slide member 41 is slidably displaced longitudinally of the support 21 by means of a power unit 42, which unit 42 comprises a fluid pressure cylinder which is also preferably of the double-acting type. The fluid pressure cylinder 42 is positioned within the tubular support 21 and includes a cylinder housing 43 having conventional head members 44 and 46 fixedly interconnected to the opposite ends thereof. The head member 44 is positioned adjacent the middle of the support 21 and is fixedly connected to the support 21 in any conventional manner, such as by screws or pins. The other head member 46 is also stationarily positioned relative to the support 21 but is of smaller cross section than the interior periphery of the support 21, whereby the head 46 is slidably received within the interior of the tubular sliding member 41.

The cylinder housing 43 has a piston 47 slidably disposed therein, and a piston rod 48 is fixed to the piston 47 and slidably projects outwardly through the head member 46. The outer free end of piston rod 48 is fixedly interconnected to a U-shaped bracket 49, which bracket 49 is fixedly anchored to and substantially closes the free end of the sliding member 41.

While only the lefthand mirror assembly 16 and left extension assembly 17 have been described above, the righthand mirror assembly 18 is identical to the lefthand mirror assembly 16, and the right extension assembly 19 is identical to the left extension assembly 17. Accordingly, the parts of the assemblies 18 and 19 have been identified by the same reference numerals used to identify the corresponding parts of the assemblies 16 and 17, respectively, but with an "A" added thereto. Further description of these assemblies is thus not believed necessary.

Figure 5:
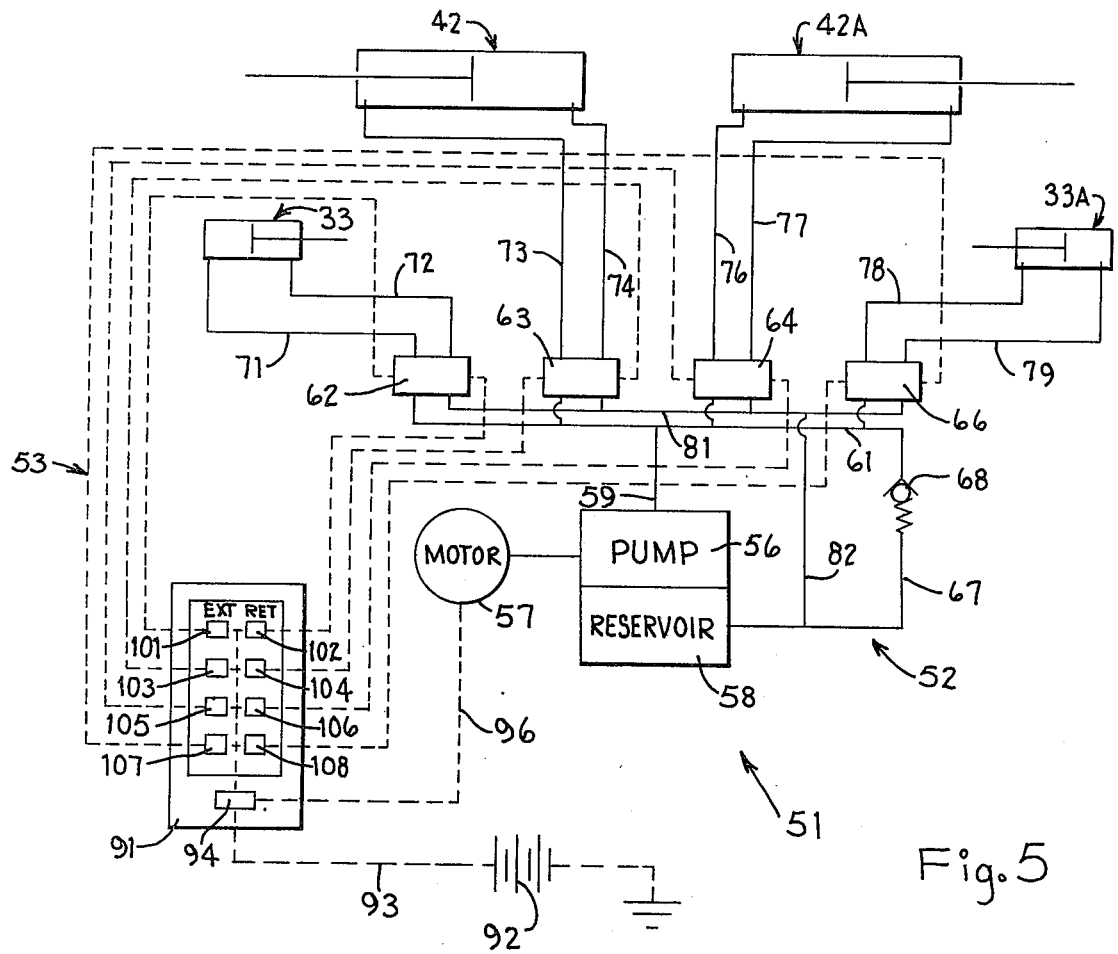
FIG. 5 is a diagrammatic view of the control system associated with the mirror system.

The movements of the mirror system 11, and specifically the extension or retraction of the individual fluid pressure cylinders 33, 33A, 42 and 42A, is controlled by a control system 51 which is diagrammatically illustrated in FIG. 5. The control system 51 includes a fluid system 52 for controlling the flow of pressure fluid to and from the individual fluid pressure cylinders, and an electrical control system 53 for controlling the activation of the fluid system by the driver of the vehicle when located in the driver's seat.

Considering first the fluid system 52, same includes a conventional pump 56 driven by an electric motor 57 and associated with a suitable reservoir or tank 58 containing therein a supply of pressure fluid, and particularly an incompressible liquid such as oil.

The pump 56 supplies pressurized working fluid to the line 59 which in turn communicates with a supply manifold 61. The flow of pressure fluid from supply manifold 61 is controlled by a plurality of valve assemblies 62, 63, 64 and 66, which assemblies respectively control the flow of pressure fluid to and from the cylinders 33, 42, 42A and 33A. The supply manifold 61 also communicates via a line 67 with the reservoir 58, the line 67 containing therein a conventional spring biased one-way check valve 68 which opens so as to permit flow through the line 67 only when the pressure of the fluid within the manifold 61 exceeds a preselected magnitude.

The valve assembly 62 controls the flow of pressure fluid to and from the lines or conduits 71 and 72, which lines are connected to the opposite ends of the pressure cylinder 33. In a similar manner, the valve assembly 63 controls the flow of fluid through lines 73 and 74 which are connected to the opposite ends of the pressure cylinder 42, the valve assembly 64 controls the flow of pressure fluid through lines 76 and 77 which are connected to the opposite ends of the pressure cylinder 42A, and the valve assembly 66 controls the flow of pressure fluid through lines 78 and 79 which are connected to the opposite ends of the pressure cylinder 33A. The valve assemblies 62, 63, 64 and 66 also communicate with a discharge manifold 81, which manifold in turn communicates with the reservoir 58 via the intermediate line or conduit 82.

Figure 6:
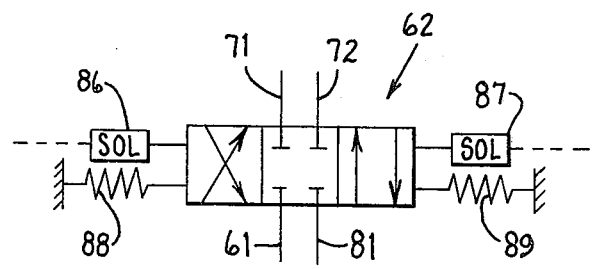
FIG. 6 diagrammatically illustrates a valve suitable for use with the control system of FIG. 5.

As illustrated in FIG. 6, valve assembly 62 comprises a conventional spool valve utilizing a double solenoid and a double spring for controlling the actuation thereof. The valve is normally maintained in a central closed position by springs 88 and 89, whereby manifolds 61 and 81 are isolated from the lines 71 and 72.

However, energization of solenoid 86 results in leftward shifting of the valve so as to connect the manifolds 61 and 81 to the lines 71 and 72, respectively, thereby resulting in extension of the cylinder 33. On the other hand, when solenoid 87 is energized, the valve is shifted rightwardly so that the manifold 61 and 81 are connected to the lines 72 and 71, respectively, thereby causing retraction of the cylinder 33.

The remaining valve assemblies 63, 64 and 66 are identical to the valve assembly 62, and thus further description of these valve assemblies is not believed necessary.

The essential components of the fluid system 52, particularly the pump 56, the reservoir 58 and the valve assemblies 62, 63, 64 and 66, are all preferably positioned within a box-like housing 69 which, as illustrated in FIGS. 1 and 3, is preferably fixedly mounted on the roof of the vehicle directly adjacent the tubular support 21. The tubular support 21 is provided with a suitable opening 84 (FIG. 4) in the sidewall thereof for permitting the lines or conduits to pass from the housing 69 into the interior of the support 21.

As also illustrated in FIG. 4, the conduits connected to the pressure cylinders extend into the interior of the tubular support 21 so as to provide extra protection for same. For example, the line 74 is connected to the head 44, whereas the line 73 extends along the outer periphery of the cylinder housing 43 and is connected to the head 46. The lines 71 and 72 associated with the cylinder 33 extend along the outer periphery of the cylinder housing 43 and are encased within a resilient springlike coil member 83 which is positioned between the head member 46 and the bracket 49 for enabling the lines 71 and 72 to suitably extend and contract as the slide member 41 is extended and retracted by the pressure cylinder 42.

The motor 57 and the valve assemblies 62, 63, 64 and 66 are controlled by the electrical control system 53. As illustrated in FIG. 5, dotted lines are used to represent the electrical conductors so as to distinguish same from the fluid conductors which have been represented by solid lines.

The electrical control system 53 includes a master control panel 91 which is disposed within the interior of the vehicle and is positioned closely adjacent the driver's seat, such as by being mounted on the dashboard of the vehicle. The control panel is electrically energized by being connected to the vehicle electrical system, such as the battery 92, by means of an intermediate electrical conductor 93. The panel 91 has a main "on-off" switch associated therewith, which switch is connected via the electrical conductor 96 to the motor 57 for controlling energization thereof.

The main control switch 94 is also connected in series with a plurality of secondary control switches 101–108, which switches are individually connected to a respective solenoid associated with one of the valve assemblies. For example, the secondary control switch 101 controls the energization of the solenoid 86 associated with the valve assembly 62 for causing extension of the pressure cylinder 33, and the secondary control switch 102 controls energization of the solenoid 87 for causing retraction of the cylinder 33. In a similar manner, the secondary switches 103, 105 and 107 respectively control the valve assemblies 63, 64 and 66 for causing extension of the respective cylinders 42, 42A and 33A. On the other hand, the remaining secondary switches 104, 106 and 108 control the remaining solenoid associated with the respective valve assemblies 63, 64 and 66 for causing retraction of the cylinders 42, 42A and 33A. The secondary control switches, by being connected in series with the main control switch 94, thus permit energization of the solenoid and actuation of the respective pressure cylinder only when the main switch 94 is moved into its "on" position, which also causes energization of the motor 57 and of the pump 56. Since the springs 88 and 89 automatically cause the individual valve assemblies to be returned into a closed position whenever the solenoids are deenergized, this always results in a complete closing of the fluid pressure cylinders so that the fluid within said cylinders is trapped therein, thereby positively locking the piston associated with each cylinder in its selected position. The pressure fluid as trapped within the individual cylinder will thus prevent accidental displacement of the mirror from its selected position, such as might occur due to externally imposed vibrations and forces.

The main control switch 94 may be of any conventional construction, such as a conventional push-type switch which is pushed so as to activate or move same to its on position, and which is again pushed to activate same to its "off" position. The secondary control switches preferably comprise push-type switches which are moved into their closed positions only so long as the push button is manually depressed, with the push-button switch being automatically returned to its open position, as by a spring, when the manual pushing force is released.

OPERATION

The operation of the mirror system according to the present invention will be briefly described to insure a complete understanding thereof.

When it is desired to change either the angular orientation or the position of either the righthand or lefthand mirror, then the driver will depress the main switch button 94 so as to move the switch into its on position, thereby energizing motor 57 and pump 56. This switch 94 can remain in its on position, even though all of the valve assemblies 62, 63, 64 and 66 are closed, since in this condition the pressure fluid will flow from the pump 56 through the line 59 into the manifold 81, whereupon the pressure of the fluid will then open the one-way check valve 68 to permit the fluid to be supplied through the line 67 to the reservoir 58.

Assuming now that the driver wishes to change the angular orientation of the lefthand mirror 29, as by rotating same counterclockwise (as viewed in FIG. 3) about the pivot axis 32, then the driver will momentarily depress the secondary control switch 101 to thus energize solenoid 86 whereby valve assembly 62 is opened so as to permit the supply of pressure fluid through the line 71 to one end of the cylinder 33, with fluid from the other end of the cylinder being exhausted through the line 72 back to the reservoir 58. So long as the control switch 101 is depressed so as to activate the valve assembly 62, the cylinder 33 will be extended so as to cause the desired angular tilting or displacement of the mirror 29. When the mirror reaches the orientation desired by the driver, then the driver will release the control switch 101, thereby permitting the spring 88 to return the valve assembly 62 to its closed position. This thus effectively closes off the cylinder 33 and causes same to remain locked in the selected position.

If the driver should desire to turn the mirror 29 in the opposite direction, that is clockwise (as viewed in FIG. 3) about the axis 32, then the driver will depress the control switch 102 so as to energize solenoid 87. Valve assembly 62 is then shifted in the opposite direction so that pressure fluid is supplied through line 72 to the one end of the cylinder 33, and pressure fluid from the cylinder 33 flows from the other end thereof through the line 71 to the reservoir 58. This thus causes retraction of the cylinder 33 so that the mirror is rotated in the opposite direction.

The angular adjustment of the righthand mirror 29A in opposite rotational directions is also controlled in a similar manner by causing either extension or retraction of the cylinder 33A, with the extension and retraction of the cylinder 33A being controlled by activation of the secondary switches 107 and 108, respectively.

When it is desired to adjust the spacing of the lefthand mirror 29 relative to the side of the vehicle, such as by moving same outwardly from the solid line position to the dotted line position as illustrated in FIG. 1, then the driver will depress the secondary control switch 103 which causes opening of the valve assembly 63 so that pressure fluid is supplied through the line 74 to one end of the cylinder 42, with pressure fluid being exhausted from the other end of the cylinder through the line 73 for return to the reservoir 58. This thus causes extension of the cylinder 42 so that the hollow slide member 41 is moved outwardly and causes a corresponding outward displacement of the mirror assembly 16. The cylinder 42 will continue to be extended so long as the control button 103 is depressed, whereupon removal of the manual depression force on the control button 103 will permit same to automatically open so that valve assembly 63 will then automatically close, thus isolating the cylinder 42 from the pump 56 and the reservoir 58 so as to maintain the cylinder 42 in a closed and locked condition.

If it is desired to move the mirror assembly 16 inwardly toward the vehicle, rather than outwardly as described above, then the button 104 will be depressed to activate the valve assembly 63 in the reverse direction, whereupon the pressure fluid from the pump 56 will then flow through the line 73 to cause retraction of the cylinder 42, thereby moving the mirror assembly 16 inwardly toward the side of the vehicle.

When it is desired to move the lefthand mirror assembly 18 outwardly or inwardly relative to the side of the vehicle, then the movement of same is controlled by means of the secondary control switches 105 and 106 in the same manner as described above with respect to the lefthand mirror assembly 16.

While the system as described above utilizes double-acting cylinders, it will be appreciated that the cylinders, particularly the cylinders 33 and 33A, could be replaced by single-acting cylinders employing a spring return. Further, the complete system could be pneumatically operated if desired, in which case the pump 56 would be replaced by a conventional compressor, and the reservoir 58 could be eliminated since the air could be drawn from and discharged directly into the surrounding atmosphere.

The mirror system of the present invention, while particularly applicable for use with trucks, and specifically trucks which haul wide and varying loads such as mobile homes and the like, is also highly desirable for use on numerous other vehicles, such as self-propelled motor homes, recreation vehicles and the like.

MODIFICATION

Figure 7:
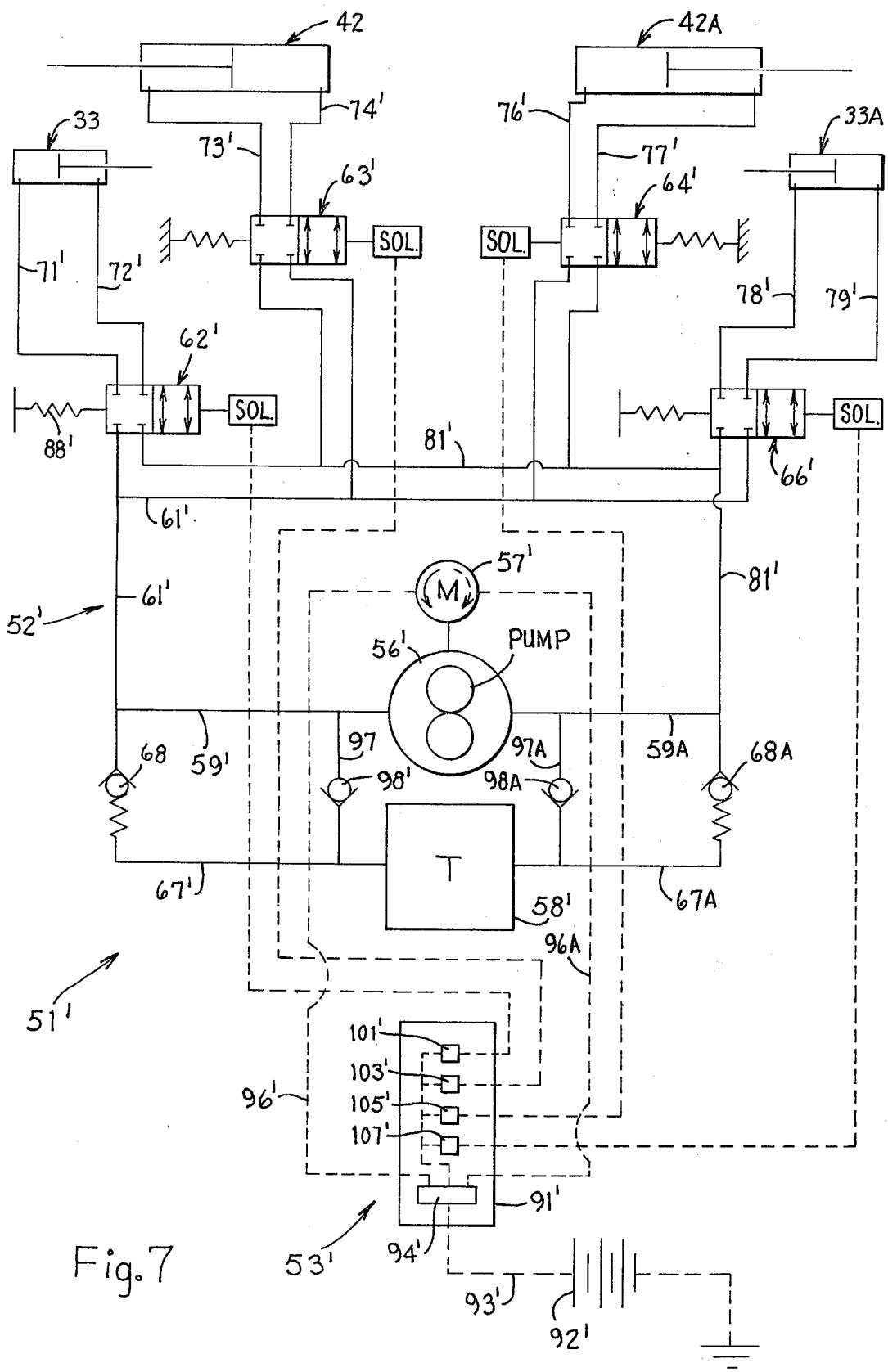
FIG. 7 is a diagrammatic view of a modified control system for use with the mirror system.

FIG. 7 illustrates therein a modified control system which can be substituted for the control system illustrated in FIG. 5. In fact, the control system of FIG. 7, which utilizes a reversible motor and pump so as to simplify the overall system, is preferred. Since many of the components in the system of FIG. 7 correspond to the components in FIG. 5, they have been identified by the same reference numerals but with a prime (') added thereto.

The control system 51' of FIG. 7 includes a fluid system 52' for controlling the flow of pressure fluid to and from the individual pressure cylinders, and an electrical control system 53' for controlling activation of the fluid system by the driver of the vehicle when located in the driver's seat. The fluid system 52' includes a conventional reversible pump, such as a rotatable gear pump, driven by a conventional reversible electric motor 57'. The pump 56' is associated with a conventional tank or reservoir 58' containing therein a supply of incompressible pressure fluid. The pump 56', when rotating in one direction, supplies pressure fluid through line 59' to the manifold 61'. By energizing one of the valve assemblies 62', 63', 64' or 66', such as by energizing the solenoid 87' associated with the valve assembly 62', then pressure fluid is supplied from manifold 61' through line 71' to one end of cylinder 33. Fluid discharged from the other end of cylinder 33 flows through line 72' to the manifold 81', from which it flows through line 59A so as to be returned to the pump 56'. If more fluid is being resupplied to the pump than is being discharged from the pump, then the excess fluid will open the spring-biased check valve 68A and flow through line 67A into the tank 58'. On the other hand, if more fluid is being discharged from pump 56' than is being returned thereto, then fluid is withdrawn from the tank 58' through the one-way check valve 98A via the line 97A. When the fluid cylinder 33 has been advanced to the desired position, then solenoid 87' is deactivated so that the spring 89' returns the valve assembly 62' to its closed position, thereby locking up the cylinder.

When it is desired to move cylinder 33 in the opposite direction, then motor 57' is energized so as to rotate in a reverse direction, thereby driving pump 56' in the reverse direction. This results in pressure fluid being supplied from pump 56' through line 59A to the manifold 81'. When solenoid 87' is energized, fluid then flows from manifold 81' through line 72' to the other end of cylinder 33. The fluid discharged from the opposite end of cylinder 33 flows through line 71' to manifold 61', from which it flows through line 59' to the pump 56'. If the fluid returned from the cylinder is greater than the quantity of fluid discharged from the pump, then the excess fluid will flow through the spring-biased check valve 68' and through the line 67' to the tank 58'. On the other hand, if the quantity of fluid being discharged from the pump 56' is less than the quantity of fluid being returned from the cylinders, then fluid is withdrawn from tank 58' through check valve 98' via line 97'.

While the specific operation described above relates solely to the operation of the cylinder 33, it will be apparent that cylinders 42, 42A and 33A are operated in an identical manner by energization of the respective valve assemblies 63', 64' and 66'.

Considering now the electrical control system 53', as illustrated by dotted lines in FIG. 7, same includes a master control panel 91' which is disposed within the interior of the vehicle so as to be accessible from the driver's seat. The control panel 91' is electrically connected to the vehicle battery 92' and has a main on-off switch 94' associated therewith. The main switch 94' is normally maintained in an off position, as by being spring urged into this position, and comprises a conventional double-pole switch which has a push button which can be rocked sidewardly into two different on positions. When the leftside of the push button is depressed to rock the switch 94' into a first on position, then line 96' is energized to cause rotation of motor 57' in one direction. On the other hand, when the switch 94' is rocked into its other on position, such as by depressing the rightside of the button, then line 96A is energized to cause rotation of motor 57' in the opposite direction.

The main control switch 94' is also connected in series with a plurality of secondary control switches 101', 103', 105' and 107', which switches are individually connected to the solenoids 87' associated with the valve assemblies 62', 63', 64' and 66' respectively. The secondary control switches preferably comprise double push-type switches which, when depressed a first time, moves the switch into its on position, and when manually depressed a second time moves the switch into its off position.

The operation of the electrical control system 53 is believed self-evident since activation of any of the secondary control switches 101', 103', 105' and 107' does not result in any change or activation of the system so long as the main switch 94' is off. When the driver wishes to adjust one of the fluid pressure cylinders, such as the cylinder 33, then the secondary control switch 101' is depressed to place it in the on position. By rocking the main switch 94' into one of its on positions, this then simultaneously results in energization of the solenoid 87' so as to open the valve assembly 62' and energization of the motor 57' so as to drive the pump 56', thereby supplying pressure fluid to the cylinder to cause extension or retraction thereof.

It will be recognized by those familiar with this art that numerous variations can be made in the electrical and hydraulic control system without departing from the spirit and scope of the present invention.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A remote controlled mirror system for attachment to the roof of a vehicle, such as a truck cab, comprising:
   elongated frame means adapted to be fixedly attached to the roof of a vehicle, said frame means including a substantially horizontally elongated frame member extending substantially transversely relative to said vehicle;
   first elongated slide means projecting outwardly from one end of said elongated frame means and supported for linear movement in a first substantially horizontal direction, said first direction being substantially parallel to the elongated direction of said frame means;

second elongated slide means projecting outwardly from the other end of said elongated frame means and supported for linear movement in a second substantially horizontal direction, said second direction also being substantially parallel to the elongated direction of said frame means;

said first and second slide means respectively including first and second elongated tubular slide members which are respectively elongated in said first and second directions;

first and second fluid pressure cylinder means respectively drivingly connected to said first and second slide means for linearly moving same relative to said frame means in said first and second directions, respectively;

said first and second cylinder means each including a stationary cylinder housing and elongated piston rod means slidably supported on said housing and projecting outwardly from one end thereof, each of said piston rod means associated with said first and second cylinder means being fixedly connected adjacent the free end thereof to said first and second tubular members respectively, each said tubular member extending in surrounding relationship to the respective piston rod means so as to enclose same and having the rearward portion thereof disposed in surrounding and slidable telescopic relationship to the respective cylinder housing;

a first mirror assembly positioned adjacent one end of said elongated frame means and hingedly supported on said first tubular slide member adjacent the outer free end thereof for angular movement about a first substantially vertical axis;

a second mirror assembly positioned adjacent the other end of said elongated frame means and hingedly supported on said second tubular slide member adjacent the outer free end thereof for angular movement about a second substantially vertical axis;

first and second fluid pressure cylinder assemblies respectively drivingly connected to said first and second mirror assemblies for angularly moving same about said first and second vertical axes, respectively;

each said fluid pressure cylinder assembly including a fluid pressure cylinder operatively connected directly between the respective mirror assembly and the respective slide means for causing angular movement of the respective mirror assembly upon extension or retraction of the respective fluid pressure cylinder, the respective fluid pressure cylinder having one end thereof connected to the respective slide means at a first point which is spaced horizontally from the respective vertical axis and having the other end thereof hingedly connected to the respective mirror assembly at a second point which is spaced horizontally from the respective vertical axis;

a power unit, including conduit means, for supplying pressure fluid to each of said fluid pressure cylinder means and said fluid pressure cylinder assemblies; and control means operatively associated with said power unit for permitting independent activation of each of said first and second cylinder means and each of said first and second cylinder assemblies.

2. A mirror system according to claim 1, wherein each said cylinder means and cylinder assembly comprises a double-acting pneumatic cylinder.

3. A mirror system according to claim 1, wherein said conduit means includes first and second conduits respectively connected to said first and second fluid pressure cylinder assemblies for permitting the flow of pressure fluid thereto, said first and second conduits including helically coiled flexible conduit portions disposed respectively within the first and second tubular slide members and positioned in surrounding relationship to the respective piston rod means so as to permit extension or contraction of the coiled conduit portion as the respective tubular slide member is slidably displaced outwardly or inwardly relative to the respective cylinder housing.

4. A remote controlled mirror system for attachment to the roof of a vehicle, such as a truck, comprising:

frame means adapted to be fixedly connected to the roof of a vehicle;

first double-acting fluid pressure cylinder means including a first elongated cylinder housing fixedly mounted on said frame means and first elongated piston rod means slidably supported on and extending outwardly from one end of said first cylinder housing, said first piston rod means being positioned to project outwardly from one side of the vehicle and being slidably movable in a first direction which extends substantially horizontally;

a second double-acting fluid pressure cylinder means including a second elongated cylinder housing fixedly mounted on said frame means and second elongated piston rod means slidably supported on and projecting outwardly from one end of said second cylinder housing, said second piston rod means projecting outwardly in the direction opposite from said first piston rod means so as to project outwardly adjacent the other side of the vehicle, said second piston rod means being slidably movable in a second direction which extends substantially horizontally and is substantially parallel to said first direction;

said frame means including elongated tubular means having first and second tubular frame portions which are respectively elongated in said first and second directions and open outwardly towards the opposite sides of the vehicle, the first and second cylinder housings being respectively fixedly positioned within the first and second tubular frame portions;

first and second slide means fixedly connected respectively to said first and second piston rod means for slidable movement in said first and second directions, respectively;

said first slide means including a first tubular slide member which is elongated in said first direction and has an inner end portion thereof disposed in surrounding and slidable telescopic relationship to said first cylinder housing, the inner end portion of said first tubular slide member also being slidably telescoped within said first tubular frame portion, said first tubular slide member surrounding said first piston rod means, the outer end portions of said first tubular slide member and said first piston rod means being fixedly connected;

said second slide means including a second tubular slide member which is elongated in said second direction and has an inner end portion thereof disposed in surrounding and slidable telescopic relationship to said second cylinder housing, the inner end portion of said second tubular slide member also being slidably telescoped within the second tubular frame portion, said second tubular slide member surrounding said second piston rod means, the outer end portions of said second tubular slide member and said second piston rod means being fixedly connected;

first and second mirror assemblies respectively mounted on said first and second tubular slide members adjacent the outer ends thereof for angular movement about first and second substantially vertical axes, respectively;

a first fluid pressure cylinder assembly mounted adjacent and drivingly connected to said first mirror assembly for selectively angularly moving same relative to said first slide means about said first vertical axis;

a second fluid pressure cylinder assembly mounted adjacent and drivingly connected to said second mirror assembly for selectively angular moving same relative to said second slide means about said second vertical axis;

power means, including conduit means, for supplying pressurized fluid to each of said first and second cylinder means and said first and second cylinder assemblies;

said conduit means including first and second flexible conduits respectively connected to said first and second fluid pressure cylinder assemblies for supplying pressure fluid thereto, said first and second conduits being disposed within and extending along said first and second tubular slide members, respectively; and control means operatively associated with said power means for permitting independent activation of each said cylinder means and each said cylinder assembly.

5. A mirror system according to claim 4, wherein said first fluid pressure cylinder assembly comprises a fluid pressure cylinder which is linearly extendable and contractable and has one end thereof hingedly connected to said first slide means and has the other end thereof hingedly connected to said first mirror assembly at a point which is horizontally spaced from said first vertical axis, and wherein said second fluid pressure cylinder assembly comprises a fluid pressure cylinder which is linearly extendable and contractable and has one end thereof hingedly connected to said second slide means and has the other end thereof hingedly connected to said second mirror assembly at a point which is horizontally spaced from said second vertical axis.

* * * * *